Patented Feb. 9, 1937

2,070,119

UNITED STATES PATENT OFFICE 2,070,119

AZO-DYESTUFFS INSOLUBLE IN WATER

Ernst Fischer, Offenbach-on-the-Main, Germany, assignor to General Aniline Works, Inc., New York, N. Y., a corporation of Delaware No Drawing. Application May 7, 1936, Serial No. 78,489. In Germany May 14, 1935

4 Claims. (Cl. 260—95)

The present invention relates to azo-dyestuffs insoluble in water; more particularly, it relates to compounds of the following general formula:

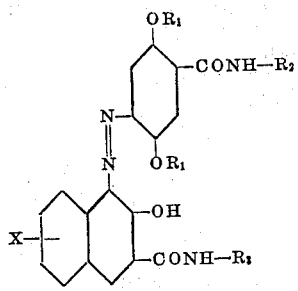

wherein X stands for one of the group consisting of hydrogen, methoxy and bromine, $R_1$ means an alkyl radical and $R_2$ and $R_3$ stand for members of the group consisting of radicals of the benzene and naphthalene series.

I have found that valuable azo-dyestuffs, the shades of which extend from violet to blue, are obtainable by coupling the diazo-compound of a base of the general formula:

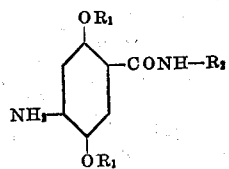

wherein $R_1$ means an alkyl radical and $R_2$ an aryl radical which may contain one or more substituents, with an arylide of 2,3-hydroxynaphthoic acid or a substitution product thereof, neither of the dyestuff components containing any group imparting solubility such as, for instance, sulfonic acid or carboxylic acid groups.

The dyestuffs may advantageously be used for the manufacture of lakes, which are fast to oils and very fast to light, by conducting the coupling operation in presence of a substratum. They are also useful for coloring organic plastic masses of high-molecular weight, especially natural rubber or synthetic products having properties similar to those of natural rubber. By incorporating the dyestuffs with rubber mixtures products are obtained which have very good fastness properties; in particular, they do not bleed into white rubber. Violet and blue monoazo-dyestuffs having such good properties and serving the aforesaid purposes, for which there is a great technical interest, have hitherto hardly been known. The processes described in German Patents Nos. 407,563, 500,931, 602,064, and 613,234 merely allow the manufacture of dyestuffs or colorations on plastic masses of high molecular weight in a scale of shades, that, if it exceeds red, reaches red-violet at most. From bases of the above general formula there are obtained in every case dyestuffs whose shades are essentially displaced towards the blue end of the spectrum, so that even clear blue dyestuffs or dyeings may be obtained.

The following examples serve to illustrate the invention, but they are not intended to limit it thereto:

(1) 15.3 grams of 1-amino-2,5-dimethoxy-benzene-4-(carbonyl-1'-amino-4'-chlorobenzene) are diazotized in the usual manner. The diazo-solution is then mixed with sodium acetate in order to bind the excess of hydrochloric acid and introduced, while stirring, into a solution of 14.65 grams of 6-methoxy-2,3-hydroxynaphthoyl-aminobenzene in dilute caustic soda solution. The precipitated dyestuff is filtered with suction, washed well and dried. It is a blue powder and has the following formula:

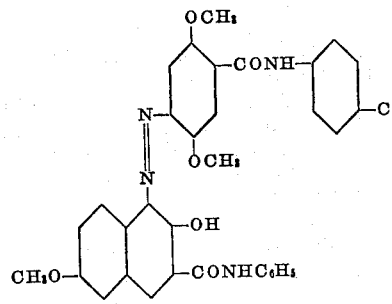

The coupling may also be conducted in the presence of a substratum adapted for the production of lakes. The lakes prepared in this manner from this dyestuff are fast to oils and yield blue tints of good fastness to light.

(2) 13.6 grams of 1-amino-2,5-dimethoxy-benzene-4-(carbonyl-aminobenzene) are diazotized as usual. The diazo-solution is rendered neutral to Congo paper by addition of sodium acetate and introduced, while stirring, into a solution of 19.35 grams of 6-bromo-2,3-hydroxynaphthoyl-1'-amino-3'-nitrobenzene in dilute caustic soda solution. The resulting violet dyestuff is filtered with suction, washed well and dried. It may be transformed in known manner, advantageously in the form of a paste, into color lakes which are fast to oils. Violet tints of good fastness to light are obtained.

(3) A pigment dyestuff is prepared as described in Examples 1 and 2 from 15.3 grams of 1-amino-2,5-dimethoxy-benzene-4-(carbonyl-1'-amino-4'-chlorobenzene) and 15.35 grams of 2,3-hydroxynaphthoyl-1'-amino-3'-nitrobenzene; violet color lakes are obtained therefrom which have a good fastness to oils and to light.

(4) The dyestuff obtained in the manner described in Example 2 from 13.6 grams of 1-amino-2,5-dimethoxy-benzene-4-(carbonyl-aminobenzene) and 16.9 grams of 6-methoxy-2,3-hydroxy-naphthoyl-1'-amino-3'-nitrobenzene is a blue powder from which blue color lakes of good fastness to oils and to light may be prepared in known manner.

(5) By using in Example 1 instead of 15.3 grams of 1-amino-2,5-dimethoxybenzene-4-(carbonyl-1'-amino-4'-chlorobenzene), 16.7 grams of 1-amino-2,5-diethoxy-benzene-4-(carbonyl-1'-amino-4'-chlorobenzene), blue color lakes of similar good properties are likewise obtained.

(6) A pigment dyestuff which is adapted for coloring rubber products is prepared as described in Example 1. Thereupon, 4 per cent. of the dyestuff is incorporated with a suitable mixture of crepe rubber, loading materials, sulfur and a vulcanization accelerator and the mixture is vulcanized in a vulcanization press for about 12 minutes at a steam pressure of 3 atmospheres above atmospheric pressure. There is obtained a vivid blue vulcanized product which has a good fastness to light and neither bleeds nor gives rise to the phenomenon known as blushing or efflorescence when the rubber articles are stored.

If the mixture of crepe rubber, the usual admixtures and 4 per cent. of the aforesaid dyestuff is vulcanized in the cold by immersing it into a solution of sulfur chloride in benzine, a vulcanized product is obtained whose properties are the same as those of the vulcanized product described above.

(7) The pigment dyestuff described in Example 3 is used in the following manner for coloring casein artificial horn:

200 grams of rennet casein, 8 grams of zinc white and 1 gram of dyestuff are mixed and the mixture is hardened by treatment with formaldehyde. A vivid violet colored horn-like mass of very good fastness properties is obtained.

The following table indicates a number of further azo-dyestuffs, obtainable according to the present invention:

| Diazo-compound from: | Coupled with: | Shade |
|---|---|---|
| 1-amino-2,5-dimethoxy-benzene- | 2,3-hydroxynaphthoyl- | |
| (1) -4-carbonylamino-benzene | -1'-amino-4'-methoxy-benzene | Violet |
| (2) -4-carbonyl-1'-amino-4'-methoxybenzene) | -1'-amino-3'-nitro-benzene | Blue |
| (3) -4-(carbonyl-2'-amino-naphthalene) | -1'-amino-2'-methyl-5'-chlorobenzene | Violet |
| (4) -4-(carbonyl-1'-amino-4'-methoxybenzene) | -1'-aminonaphthalene | Violet |
| (5) -4-(carbonyl-1'-amino-2'-methylbenzene) | -aminobenzene | Violet |
| (6) -4-carbonylamino-benzene | -aminobenzene | Violet |
| | 6-methoxy-2,3-hydroxy-naphthoyl- | |
| (7) -4-carbonylamino-benzene | -1'-aminonaphthalene | Blue |

Since an object of the present invention is to produce dyestuffs of good fastness properties which dyestuffs are insoluble in water, it is to be understood that the aromatic nuclei of the general formula appearing in the appended claims do not contain any substituents which are known to render the dyestuffs soluble in water. Substituents of this kind are, for instance, the sulfonic acid and carboxylic acid group.

I claim:

1. The water-insoluble azo-dyestuffs of the following general formula:

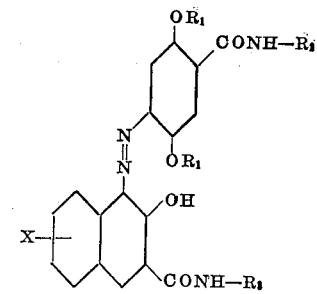

wherein X stands for one of the group consisting of hydrogen, methoxy and bromine, $R_1$ means an alkyl radical and $R_2$ and $R_3$ stand for members of the group consisting of radicals of the benzene and naphthalene series, yielding violet to blue lakes which are fast to oils and to light and, when incorporated with rubber mixtures, violet to blue products of good fastness to light and to vulcanization.

2. The water-insoluble azo-dyestuff of the following formula:

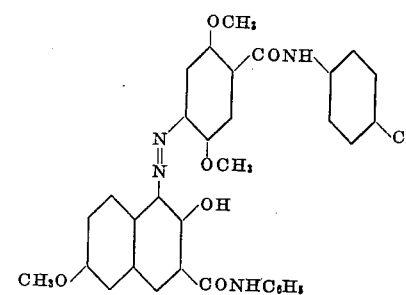

yielding blue lakes which are fast to oils and to light and, when incorporated with rubber mixtures, blue products of good fastness to light and to vulcanization.

3. The water-insoluble azo-dyestuff of the following formula:

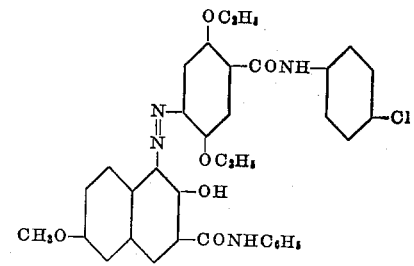

yielding blue lakes which are fast to oils and to light and, when incorporated with rubber mixtures, blue products of good fastness to light and to vulcanization.

4. The water-insoluble azo-dyestuff of the following formula:

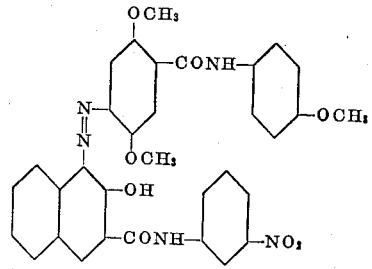

yielding blue lakes which are fast to oils and to light and, when incorporated with rubber mixtures, blue products of good fastness to light and to vulcanization.

ERNST FISCHER.